United States Patent Office 3,056,965
Patented Oct. 9, 1962

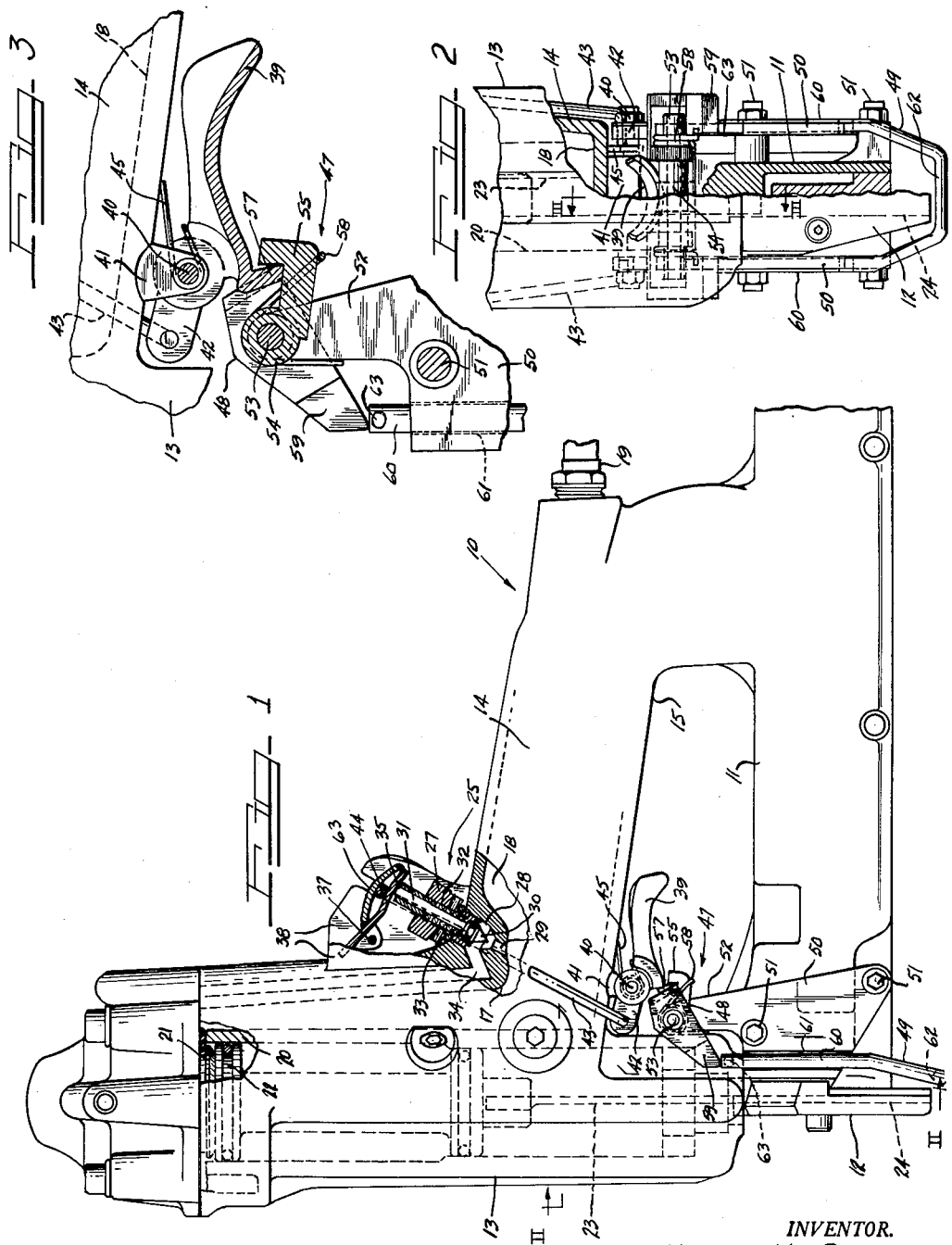

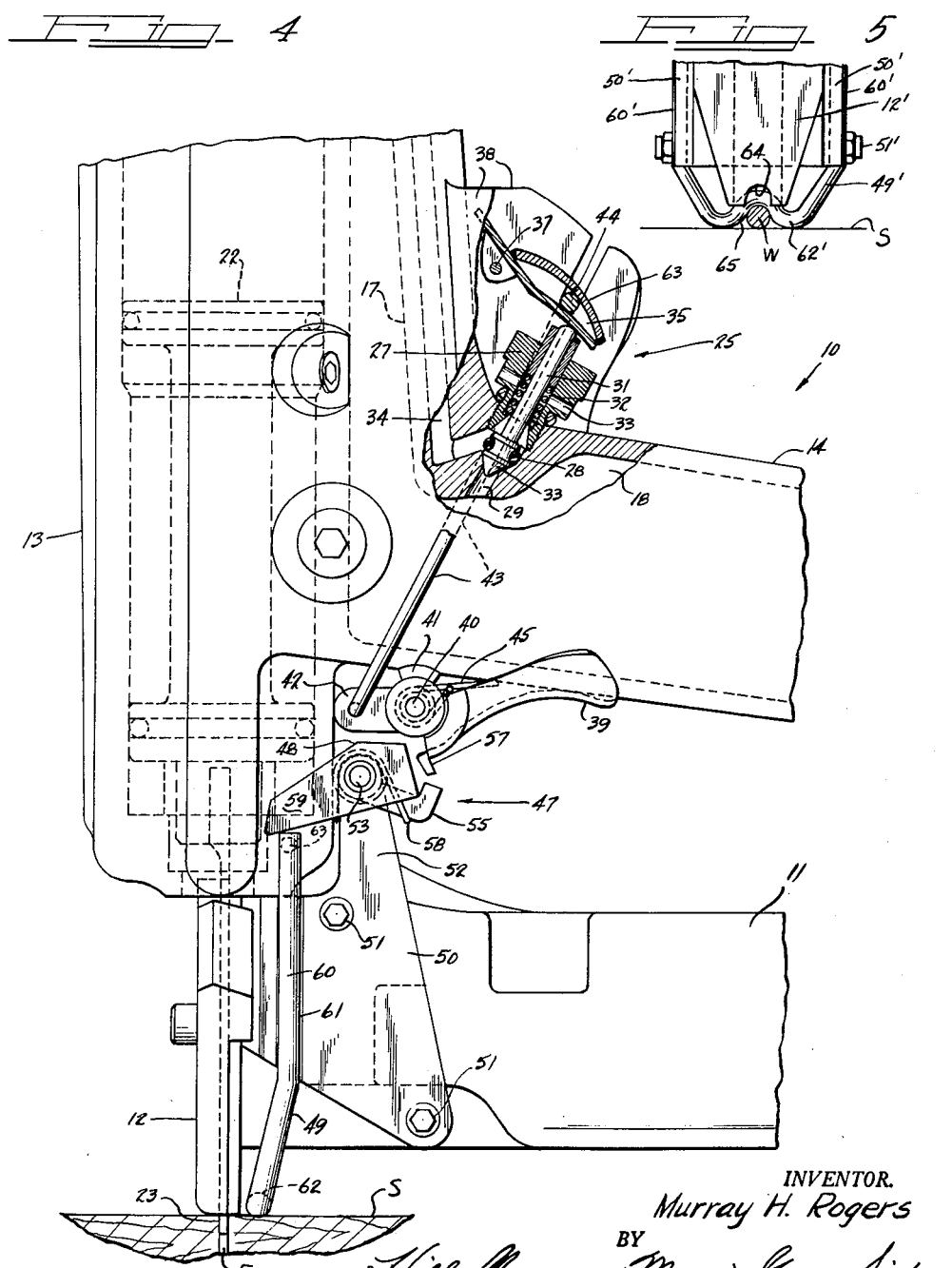

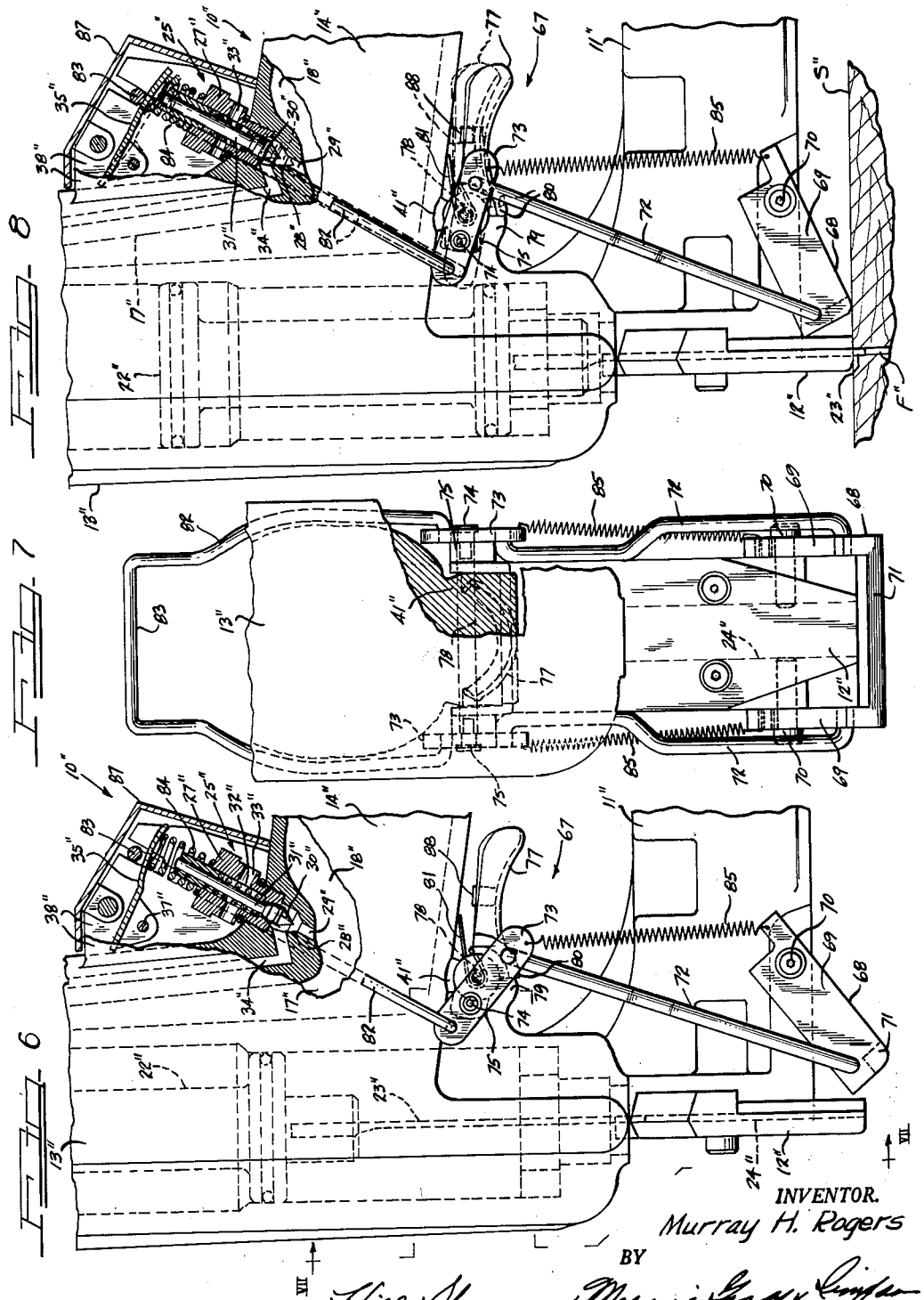

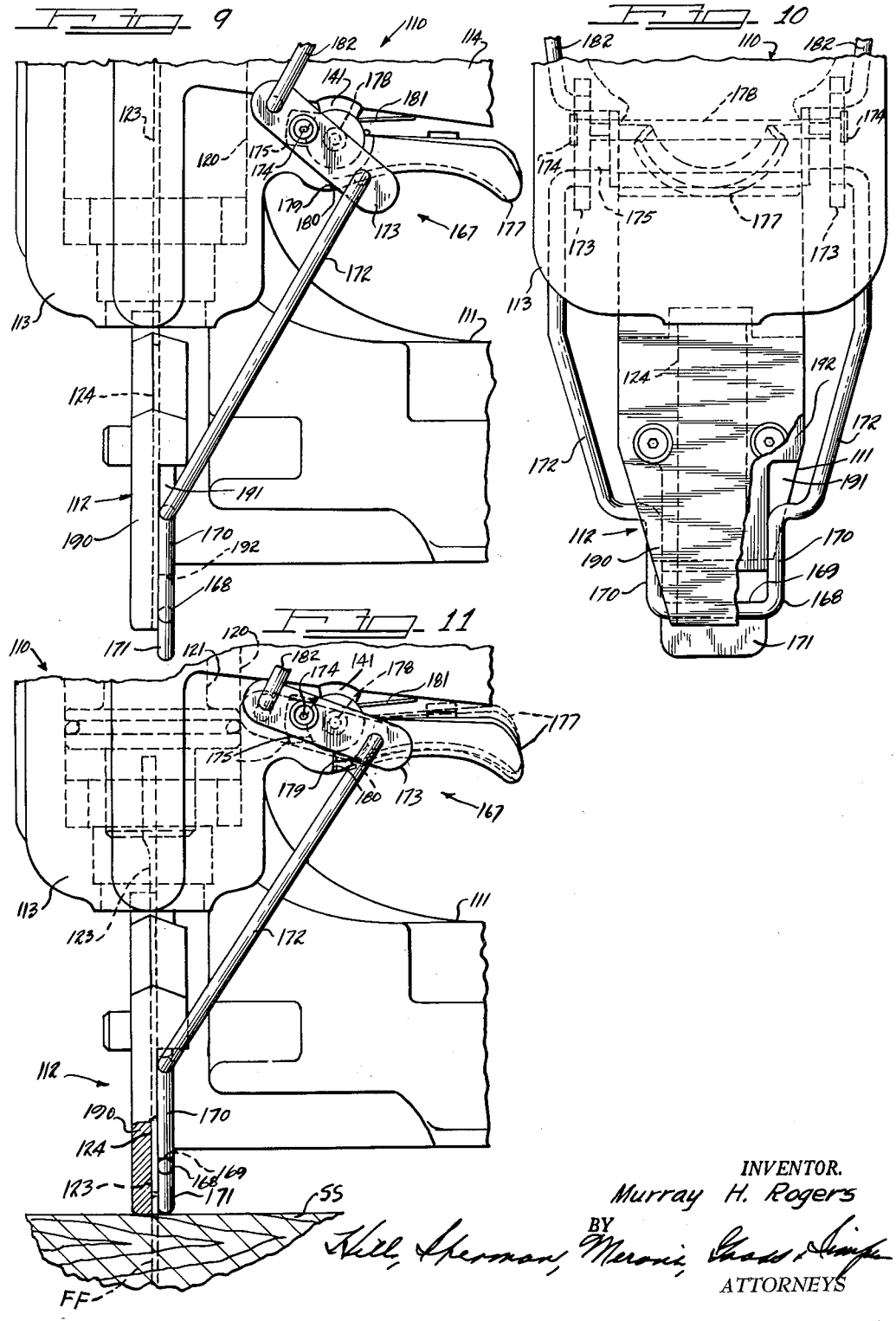

3,056,965
SAFETY MECHANISM FOR PNEUMATIC
FASTENER DRIVING MACHINES
Murray H. Rogers, Park Ridge, Ill., assignor to Spotnails, Inc., Evanston, Ill., a corporation of Illinois
Filed Oct. 24, 1960, Ser. No. 64,597
18 Claims. (Cl. 1—106)

The present invention relates to improvements in safety mechanism for pneumatic fastener driving machines and more particularly such mechanism which will prevent operation in a fastener driving stroke, that is, actuation and sometimes referred to as "firing," of such a machine unless it is oriented with respect to a work surface into which a fastener is to be driven.

In pneumatic fastener driving machines such as disclosed in John E. Goldring et al. Patent 2,872,901, fasteners such as staples, pins, nails, and the like, are driven with great force by a pneumatic piston actuated driving blade from a driving nose of the machine. Such velocity is attained that if the machine (most generally referred to in the field as an "air gun") is actuated with the driving nose more or less aimlessly pointing into the air, the fastener is propelled upon ejection on the order of a projectile. It is to avoid the inherent dangers involved in such actuating that is the purpose of the present invention.

Accordingly, it is an important object of this invention to provide new and improved safety means for pneumatic fastener driving machines which will require the machine to be oriented with respect to a surface into which a fastener is to be driven before the machine can be actuated.

Another object of the invention is to provide a novel mechanical safety device for pneumatic fastener driving machines which can be readily installed as optional equipment or may be applied as standard equipment on pneumatic fastener driving machines.

A further object of the invention is to provide a mechanical safety device for pneumatic fastener driving machines which is of simple, rugged construction and positive in operation.

Still another object of the invention is to provide a new and improved safety device for pneumatic fastener driving machines affording substantial versatility for high speed operation of the machine in service.

Other objects, features and advantages of the present invention will be readily apparent from the following detailed description of certain preferred embodiments thereof taken in conjunction with the accompanying drawings, in which:

FIGURE 1 is a fragmentary side elevational view of a pneumatic fastener driving machine embodying features of the invention and with certain parts thereof broken away and in section to reveal details of structure;

FIGURE 2 is a fragmentary front elevational view of the nose end portion of the machine of FIGURE 1, with certain parts broken away to show details of structure, substantially on the line II—II of FIGURE 1;

FIGURE 3 is an enlarged fragmentary vertical sectional elevational view taken substantially on the line III—III of FIGURE 2 and showing the trigger and interlock pawl structures of the safety device in some detail;

FIGURE 4 is an enlarged fragmentary side elevational view of the portion of the machine of FIGURE 1 carrying the safety mechanism and showing the safety mechanism as it appears during proper actuation of the machine;

FIGURE 5 is a fragmentary front elevational view of the nose portion of a fastener driving machine showing a slight modification to enable efficient attachment of wire, beading and the like;

FIGURE 6 is a fragmentary side elevational view of a fastener driving machine carrying a modified arrangement of the safety mechanism;

FIGURE 7 is a front elevational view, partially broken away to reveal details of structure, taken substantially on the irregular line VII—VII of FIGURE 6;

FIGURE 8 is a fragmentary side elevational view similar to FIGURE 6 but disclosing the safety mechanism during actuation of the pneumatic driving machine;

FIGURE 9 shows a fragmentary side elevational view of a fastener driving machine carrying a further modified arrangement of the safety mechanism;

FIGURE 10 is a fragmentary front elevational view of the machine of FIGURE 9 but with a portion of the front plate of the nose assembly broken away to reveal details of structure; and FIGURE 11 is a fragmentary side elevational view similar to FIGURE 9, but disclosing the safety mechanism during fastener setting operation of the machine.

Referring to FIGURE 1, a manually operated pneumatically actuated fastener driving machine 10 is constructed and arranged to function substantially as disclosed in the aforesaid Patent 2,872,901 and reference is invited to said patent for details of structure and operation that may not be clearly evident from the present disclosure. This machine includes a housing which may be constructed as a casting made from aluminum, magnesium or other lightweight material providing on its lower portion a horizontal magazine section 11 within which the fasteners such as staples, nails or pins are adapted to be supported and pushed by any suitable advancing or feeding mechanism toward a forward end driving nose structure 12 secured thereto under an upwardly projecting driving head 13 within which pneumatic motor mechanism is housed. On the upper portion of the housing body rearwardly of and attached to the driving head is a manipulating handle 14 which at it rear end portion is attached to the magazine section 11 and defines therewith a hand hole 15 the forward end of which is bounded by the lower end portion of the head section 13.

Within the driving head section 13 of the casing or housing of the machine 10 is a substantial volume fluid reservoir space 17 with which an auxiliary reservoir space 18 within the handle 14 communicates. Pneumatic pressure fluid such as compressed air is adapted to be delivered into the handle reservoir space 18 from a suitable source through a conduit 19 attached to the rear end of the handle 14. It is common to employ compressed air under pressure up to 100 p.s.i. for operating the machine.

Within the head section 13 is a vertical cylinder 20 arranged to have its upper end exposed to pneumatic fluid within the reservoir 17 but normally closed by a pneumatically operable control valve 21 whereby a driving piston 22 in the cylinder 20 may be biased into the upper, load position shown in FIGURE 1 ready to be activated in a driving stroke for motivating a driver blade member 23 down through a driveway 24 in the driving nose 12 of the machine to drive a fastener fed into the driveway 24 from the magazine section 11.

Control over the cylinder control valve member 21 is effected through the medium of a valve structure 25 located at juncture of the upper side of the handle 14 with the head section 13. For this purpose the valve structure includes a body member 27 secured within the outer end of a bore 28, the inner end of which communicates by way of a port 29 with the pneumatic fluid reservoir 17, 18. A valve member 30 having a stem 31 projecting through the body 27 is normally biased by a spring 32 into closing relation to a vent passage 33 to atmosphere through the valve body 27. In this normal position of the valve member 30 pneumatic fluid from the reservoir passing through the port 29 and the inner portion of the bore 28 travels from the bore 28 through a passage 34 in the head section 13 to the upper end portion of the head section and thus acts upon the control valve member 21 to close the upper end of the cylinder 20 in the manner described in Patent 2,872,901. However, when the machine is to be actuated, the valve 30 is depressed by pressing inwardly on the outer end of the stem 31 for thereby opening the vent passage 33 and closing off the port 29 by means of the valve 30, whereby to vent the pneumatic control system for the cylinder controlling valve 21 through the passage 34. This unbalances the valve 21 so that pressure fluid within the reservoir 17 drives it from its seat on the mouth end of the cylinder 20 so that the pressure fluid in the reservoir will act instantaneously to drive the driver piston 22 and thus the driving blade 23 in a highly accelerated fastener driving stroke.

Actuation of the valve stem 31 may be effected digitally through the medium of a thumb lever 35 pivotally mounted as by means of a pin 37 between suitable upwardly and rearwardly extending ears 38 on the housing of the machine flanking the valve structure 25.

In addition, a valve operating lever 39 is mounted as a trigger lever under the handle 14 adjacent to the head section 13. For this purpose the trigger lever 39 is mounted pivotally as by means of a pin 40 on a suitable boss 41 provided on the machine casting. As best seen in FIGURES 1 and 3 the principal portion of the trigger lever 39 extends rearwardly under the handle 14 for convenient digital manipulation. Projecting forwardly on the lever trigger member 39 is a pair of lever arms 42, one at each side of the trigger lever, to which a connecting link member 43, conveniently in the form of a bail is pivotally connected. On its upper end portion the link bail member 43 has a cross bar 44 which engages upon the valve-actuating lever 35 so that digital manipulation of the trigger lever 39 to swing it counterclockwise as viewed in FIGURE 1 will depress the bail link member 43 and thus the actuating lever 35 to actuate the valve assembly 25 for closing the pressure fluid port 29 and bleeding the cylinder controlling valve passage system 34 to actuate the machine. Although the return spring 32 of the valve mechanism 25 acts normally to maintain the bleed-off valve and associated mechanism in the ready, inactive condition, a biasing return spring 45, which may be of the yoked sear type, acts to bias the trigger lever 39 toward inactive position, substantially as shown in FIGURES 1 and 3.

According to the present invention, means are provided which will prevent actuation of the air gun 10 unless the same is oriented for driving a fastener into a particular object such as a workpiece to receive the fastener. In a practical embodiment such means comprise a safety mechanism 47 having a connection with the trigger lever 39 for preventing actuating manipulation of the trigger lever unless a surface into which a fastener is to be driven is engaged by or at least quite closely approached by the tip of the nose 12 of the machine.

In the embodiment of FIGURES 1–4, the safety mechanism 47 includes a holding pawl 48 operatively associated with the trigger lever 39 and a pawl releasing trip member 49, both supported by supporting bracket structure including a pair of complementary but similar left and right side supporting bracket plates 50 attached to the forward portion of the magazine section 11 of the machine housing adjacent to the lower end portion of the head 13 of the machine. Attachment of the supporting bracket plates 50 to the machine casting is by means of a pair of screws or bolts 51 in a manner to maintain the plates in spaced parallel vertical planes with upstanding supporting ears 52 on the plates supporting therebetween a pivot rod or shaft 53 on which a bearing portion 54 of the pawl member 48 is journaled. Projecting rearwardly and upwardly from the center of the bearing portion 54 is a rigid generally hook-shaped catch or dog detent 55 disposed to engage interlockingly with a rigid generally downwardly projecting lug 57 on the overlying forward portion of the digitally engageable part of the trigger lever 39. A yoked sear type wire spring 58 normally biases the pawl 48 in a counterclockwise direction as viewed in FIGURES 1 and 3 into holding relation of the detent 55 with the lug 57.

At each side, the pawl member 48 has a forwardly and downwardly extending trip finger 59 projecting forwardly of the bearing 54 and engageable with the upwardly facing terminal of one of a pair of upwardly extending trip arms 60 of the trip member 49 which are elongated vertically and reciprocably guided in vertical guide grooves 61 in the respective supporting plates 50. At their lower ends the arms 60 are connected together by a cross bar foot 62 of the trip member. Respective retaining lugs 63 on the inner sides of the upper end portions of the arms 60 prevent downward escape displacement of the arms 60 from the supporting plates 50.

Normally the trip foot 62 projects a predetermined distance below the lower end or tip of the fastener guiding nose 12 of the machine. In this position of the trip member 49 the pawl dog 55 holds the interlock lug 57 against digital manipulation of the trigger lever 39 and thus actuation of the machine. However, when the machine is brought into such relation to a surface S (FIG. 4) as to displace the trip member 49 upwardly by engagement of the foot 62 against the surface until the nose 12 engages the surface, the pawl member 48 is rocked by upward thrust of the trip arm 60 against the trip fingers 59 whereby to release the dog 55 from the interlock lug 57. This frees the trigger lever 39 for digital actuation as shown in FIGURE 4 so that the link 43 will be operated to depress the valve operating lever 35 for shifting the valve 30 into closing relation to the port 29 and opening relation to the bleed-off 33 and thus effecting a driving cycle of the machine including a driving stroke of the piston 22 and the driving blade 23 to drive a fastener F into the member providing the surface S. After such actuation of the machine 10, release of the lever trigger 39 enables the biasing spring 45 to return the trigger lever to its ready position, with corresponding upward return of the link member 43 which acting through the cross bar 44 thereof on an overlying crown retainer 63 on the valve actuating lever 35 snaps the latter away from the valve stem 31 so that the valve spring 32 will return the valve to vent closing position and restore the pneumatic control system for the piston 22 to the load or ready relationship thereof.

Should the machine 10 now be lifted away from the surface S, the pawl biasing spring 58 snaps the safety mechanism into latching or interlock relation to the trigger lever. However, if another fastener F is to be driven into the member having the surface S, the nose 12 of the machine may be relocated without lifting it from the surface S, whereby the safety mechanism 47 will remain disabled by virtue of the trip member 49 remaining in the pawl-releasing position, and the trigger lever 39 can then be motivated for again actuating the machine without interference from the safety mechanism. This enables rapid "stitching" actuation of the machine with respect to a piece to be attached, but whenever the machine is moved from the surface S any appreciable distance, in this instance a distance about equal to or only slightly greater than the diameter of the foot bar 62, the safety mechanism 47 positively functions to lock the trigger lever 39 and through the link 43 the valve actuating lever 35 positively against actuation until the safety mechanism 47 is again released by engagement of the trip member 49 against the surface into which a fastener is to be driven.

In the modification of FIGURE 5 provision has been made for securing to surface S a member such as a wire W by means of staples driven by a pneumatic machine such as the air gun 10 equipped with similar safety mechanism. In FIGURE 5, therefore, primed reference numerals identify identical parts of the machine and safety mechanism as in FIGURES 1, 2 and 4. In order to accommodate the member W to be attached, the nose piece 12' is provided with a central downwardly opening notch 64 in its tip to clear the member W and enable engagement of the surface S by the nose tip. Likewise, the foot cross bar 62' of the trip member 49' has a matching upward indentation therein providing a downwardly opening central notch 65 to afford clearance for the member W. Furthermore, the notch 65 affords a convenient centering device since the foot 62' in order to make contact with the surface S must be substantially centered over the member W within the notch 65. This affords alignment of the member W with the central notch 64 in the fastener guiding nose 12'. Operation of the machine as thus modified is the same as described for the machine 10 of FIGURES 1–4.

In FIGURES 6, 7 and 8 a modified safety mechanism 67 is depicted operatively mounted on a pneumatic fastener driving machine or air gun 10'' and since the structure and operation of the machine itself are identical with the pneumatic fastener driving machine 10 all common elements of the structure have been identified by the same but double primed reference numerals and it will be understood that the description applied to the machine 10 relates equally to the machine 10''.

Since it is sometimes desirable to operate the machine by utilizing the safety device as a trigger, the safety mechanism 67 is constructed for this mode of operation in addition to digital trigger operation. To this end, the safety mechanism 67 includes a generally U-shaped trip member 68 which has respective side arms 69 pivotally connected by means such as a bolt 70 to the magazine section 11'' of the machine rearwardly adjacent to the nose 12'' and projecting downwardly and forwardly to a cross bar foot 71 normally extending downwardly a limited distance below the tip of the nose 12'. Pivotally connected to the forward end portion of each of the arms 69 is an upwardly extending trip link 72. Each of the respective trip links 72 has its upper end pivotally connected to the rear end portion of a respective lever 73 projecting generally forwardly and rockably secured for vertical movement by means of a pivot member 74 to a forwardly projecting ear or arm 75 on a digitally operable trigger lever 77 underlying the handle portion 14'' of the machine. Means such as a pin 78 secures the trigger lever 77 to the supporting lug or boss 41'' on the machine casting on the underside of the handle 14'' adjacent to the head section 13''. On its underside, the boss 41'' has a stop shoulder 79 engageable by a stop shoulder 80 on the trigger lever 77 below the pivot 78 to determine the at rest or ready normal position of the trigger lever under the bias of a sear type yoke biasing spring 81 engaging the trigger lever.

It will be observed that the pivots 74 for the respective rock levers 73 are located a predetermined distance forwardly from the pivot 78 for the trigger lever 77. Thereby, actuation of the trigger lever 77 in opposition to bias of the spring 81 to pivot the trigger lever counterclockwise causes the rock levers 73 to be moved downwardly a limited distance. In addition, since the respective trip links 72 are pivotally connected to the rock levers 73 rearwardly relative to the respective pivots 74 for the rock levers upward swinging movement of the trip member 68 about its pivot 70 causes counterclockwise movement of the rock levers 73 as viewed in FIGURES 6 and 8. Such rocking of the rock levers 73 is utilized for actuating the control valve 25'' through the medium of a link member 82 of generally bail shape having ends pivotally connected to the forward end portions of the rock levers 73, forwardly from the respective pivots 74 and having a head cross bar 83 engaging upon the valve actuating lever 35''.

Normally biasing means in the form of a coiled compression spring 84 disposed about the valve stem 31'' and seated on the valve body 27'' and thrusting against the underside of the lever 35'' maintains the lever 35'' in predetermined spaced relation to the opposed upper tip of the valve stem 31''. Also, biasing means in the form of respective tension springs 85 are connected between the rear ends of the rock levers 73 and the rear ends of the respective adjacent arms 69 of the trip member 68 and act to draw the thus connected ends toward one another and spread the respective forward ends of the rock levers 73 and the forward end portion of the trip member 68 apart to the extent permitted by the trip links 72. In this relationship, the safety mechanism 67 is inactive and the fastener driving machine 10'' is in condition for actuation in a fastener driving stroke, assuming, of course, that an active supply of pneumatic fluid is in the reservoir 17'', 18'' of the machine.

In order to preclude actuation of the machine 10'' except through the trigger lever 77, a closure or cover 87 is secured to the ears 38'' to preclude digital access to the valve actuating lever 35'' while the cover is in place.

Actuation of the machine or air gun 10'' by manipulation of the trigger lever 77 alone is precluded by the rock lever connection of the actuating link member 82 to the trigger lever so that as the trigger lever 77 is pulled up toward the underside of the handle 14'' to the extent permitted by a stop lug 88 on the trigger lever only a limited downward pull on the actuating link member 82 is effected, less than enough to drive the valve actuating lever 35'' against bias of the spring 84 into actuating engagement with the valve stem 31''. It requires full actuation of the trigger lever 77 and full actuation of the trip member 68 in order to effect actuation of the machine 10'' by virtue of the particular manner in which the trip member and the valve actuating link 82 are connected to the trigger lever 77 through the rocker levers 73. Thus, only when the trip member 68 has been tripped by engagement with a surface S'' into which a fastener is to be driven, as shown in FIGURE 8, will squeezing of the trigger lever 77 be effective to actuate the pneumatic machine. This results from rocking of the rock levers 73 about their respective pivots 74 on the trigger lever in counterclockwise direction as illustrated by upward thrust of the trip links 72 imparted by the trip member 68 which has been swung in clockwise direction by engagement with the surface S'' and engagement of the surface by the nose 12'' of the machine ready for driving of a fastener into the surface. As the rock levers 73 swing about their pivots 74, as thus described, to move the rear end portions of the rock levers upwardly and the front end portions thereof downwardly, the valve actuating link 82 is drawn downwardly to depress the valve actuating lever 35'' against the bias of the spring 84. However, such depression of the lever 35'' is not sufficient to actuate the valve 30'' but only brings the actuating lever 35'' closely adjacent to the crown end of the valve stem 31'' as shown in full outline in FIGURE 8.

Finally, actuation of the pneumatic machine can now be effected by squeezing the trigger lever 77 which as it is swung upwardly pivotally about its pivot 78 causes the ears 75 thereof to swing downwardly and thus correspondingly causes the forward end portions of the rock levers 73 to swing downwardly, the rear end portions of the levers 73 being held at this point by the trip links 72 to swing or pivot at their rear end portions about the pivotal connections with the trip links. This additional downward swinging of the forward end portions of the rock levers 73 is predetermined to be sufficient to cause depression of the actuating lever 35'' through a distance that will depress the valve stem 31'' to the extent necessary to shift the valve 30'' from its normal position into blocking relation to the pressure fluid port 29'' and open relation to the bleed-off passage system 33''. Hence, the pneumatic machine is actuated in a driving stroke wherein the piston 22'' drives the driver blade 23″ which in turn drives a fastener F″ through the surface S″ into the member to receive the fastener.

If it is desired to stitch drive a succession of fasteners into the surface S″, the nose 12″ of the machine may be dragged on the surface into the successive places a fastener needs to be received, thus maintaining the trip member 69 in its tripping position, namely the full line position of FIGURE 8. Thereby, repeated rapid actuation of the machine can be accomplished entirely through squeezing manipulation of the trigger lever 77 through the limited range necessary as visualized between the full line and dash outline positions of FIGURE 8.

On the other hand, the safety mechanisms 67 permits what may be referred to as "bump firing" of the machine 10″. That is, while maintaining the trigger lever 77 in its squeezed or actuating position as shown in dash outline in FIGURE 8, lifting the machine away from the surface S″ or a succession of surfaces into which fasteners are to be driven and thus permitting the trip member 69 to act as a trigger. For this type of actuation, although the trigger lever 77 is held in actuating position, as the machine is lifted away from the surface S″, the trip member 68 swings down to the ready position substantially as shown in FIGURE 6 under the combined influence of the springs 84 and 85 thus swinging the rock levers 73 about their pivots 74 sufficiently to release the valve 30″ to close the bleed-off and restore the pneumatic fluid system to the driving piston control mechanism. However, the valve actuating lever 35″ is held close to the crown tip of the valve stem 31″ for quick valve actuation each time the tip of the driving nose 12″ is brought into contact with the surface to receive a fastener, with corresponding tripping or triggering of the trip member 68.

Referring to FIGURES 9, 10 and 11, a pneumatic fastener driving machine 110 is depicted which in general respects is the same as the fastener driving machine 10″ of FIGURE 6 and it will be understood that structure and operation of the machine 110 except where hereinafter otherwise described are identical and included by reference in the description of the machine 10″. Thus, the machine 110 has a magazine section 111 on the forward end of which is mounted a nose structure 112 under and in alignment with a head section 113 rearwardly from which extends a handle 114 in overlying spaced relation to the magazine section 111. Within the head section is a pneumatic cylinder 120 within which is reciprocably mounted a piston 121 (FIG. 11) carrying on its lower end a driving blade member 123 by which during a driving stroke a fastener is driven down through a driveway 124 extending down through the nose assembly 112.

A safety mechanism 167 embodies the functional characteristics of the safety mechanism 67 of FIGS. 6–8 but is of a simplified construction. Instead of a separate trip member, the safety mechanism 167 has a one-piece formed generally U-shaped heavy wire trip member 168, on the order of trip member 49 of FIGS. 1–4 but notified to function in a two stage mechanism like the mechanism 67 of FIGS. 6–8. To this end, the trip member 168 has a lower cross bar 169 from which extend vertically upwardly a pair of spaced parallel guide portions 170. Projecting downwardly rigidly from the cross bar 169 is a contact plate extension 171 which normally projects a desired distance below the tip of the nose assembly 112. Extending upwardly and rearwardly from the vertical guide portions 170 are respective link arms 172 each of which has its upper end connected to the rear end portion of a respective rock lever 173 projecting generally forwardly and pivotally secured for vertical movement by means of a pivot member 174 to a forwardly projecting ear or arm 175 on a digitally operable trigger lever 177 underlying the handle portion 114 of the machine. A pin 178 secures the trigger lever 177 to a supporting lug boss 141 on the machine casting on the underside of the handle 114 adjacent to the head section 113. On its underside the boss 141 has a stop shoulder 179 engageable by a stop shoulder 180 on the trigger lever 177 below the pivot 178 to determine the at rest or ready normal position of the lever 177 under the bias of a sear type yoke biasing spring 181 engaging the trigger lever.

Forwardly of its pivot 174 the rock lever 173 is pivotally connected in each instance, to an arm 182 of a link member corresponding to the link member 82 of FIGS. 6–8 for operating the pneumatic control valve of the machine. The organization of the various pivots of the rock levers 173 is the same as already described in connection with the rock levers 73 of FIGS. 6–8. That is, the pivots 174 of the rock levers 173 are located a predetermined distance forwardly from the pivot 178 for the trigger lever 177, while the trip link arms 172 have their pivots rearwardly from the pivot 174 and the connecting link member 182 has its connecting pivots disposed forwardly from the pivots 174. Through this arrangement, action of biasing means associated with the pneumatic control valve structure, such as the control valve biasing spring 84 shown in FIGURE 6, normally draws the connecting link 182 upwardly, effecting a pivotal relationship of the rock levers 173 about their pivots 174 wherein the forward end portions of the rock levers are tilted upwardly and the rear end portions are tilted downwardly, resulting in the trip member 168 being disposed in a depressed position wherein the presser foot plate element 171 extends a predetermined distance below the lower nose tip of a front plate member 190 of the nose assembly 112 as best seen in FIGS. 9 and 10. This is the ready or load relationship of the elements and actuation of the air gun machine is precluded until the machine is properly oriented relative to a surface into which a fastener fed by suitable means (not shown) from the magazine section 111 into the driveway 124 of the nose assembly 112 is to be driven.

Upon bringing the machine 110 into position with respect to a surface SS (FIG. 11) into which a fastener is to be driven, the foot member 171 is displaced by engagement with the surface to move toward the head section 113, that is upwardly as viewed in FIG. 11, until the nose tip of the front plate 190 engages or at least approaches into close contiguity to the surface SS. In such movement of the foot member 171, it correspondingly shifts the rigidly attached trip member 168 which is reciprocably guided by slidable engagement of the portions 170 of the trip member in suitable guideways 191 afforded between the rear face of the front plate 190 and the front face of the magazine section 111 of the machine, as best seen in FIG. 10, a back plate 192 being appropriately recessed at its sides to accommodate the portions 170 and serving as a centering means between the spaced portions 170. In addition, of course, the back plate 192 serves as a spacer between the front plate 190 and the front face of the magazine section 111 of the machine casting and for free sliding guided action of the trip member guide portions 170 the thickness of the back plate 192 may be slightly greater than the thickness or gauge of the guide portions 170.

In order to accommodate the length of the presser foot 171 of the trip member and the width of the cross bar 169 added thereto, the tip end portion of the back plate 192 is shorter than the tip end portion of the front plate 190, as shown, a substantially equivalent distance, as may be readily visualized on comparison of FIGS. 10 and 11. Then, when the foot member 171 and the cross bar 169 are retracted, that is displaced by engagement with the surface SS, the foot plate member 171 and the cross bar 169 coact as a unit in continuation of the nose tip end portion of the back plate 192 in cooperation with the nose tip end portion of the front plate 190 to complete the tip end portion of the fastener driveway 124.

After the machine has been positioned with respect to the surface SS to receive a fastener, and the trip member 168 has been displaced as shown in FIG. 11, rocking of the rock levers 173 about their pivots 174 has also been effected into the position shown in full outline, but insufficiently to actuate the associated pneumatic control valve through the link 182, similarly as described in connection with FIG. 8, prior to actuation of the trigger lever 177. Actuation of the machine can then be effected by tripping the trigger 177 as indicated in FIG. 11 from the full line position into the dash line position, whereupon the trip levers 173 are depressed about the pivots afforded by the connections thereof with the trip link arms 172 through the action of the forward arms 175 of the trigger lever. This further depresses the actuating control link 182 to actuate the control valve similarly as described in connection with FIG. 8. As a fastener FF is driven into and through the surface SS, as shown in FIG. 11, it is guided through the driveway 124 formed in the lower or terminal end portion of the nose assembly 112 between the front plate 190 and the trip member portions 169 and 171. For illustrative purposes, FIG. 11 shows this relationship in dash outline in a stop motion position just before the fastener FF has been fully driven into the surface SS.

It will be understood, of course, that stitch driving to drive a succession of staples into the surface SS without substantially lifting the machine away from such surface and by repeated manipulation of the trigger lever 177, as well as "bump firing" by successively lifting the machine away from the surface to receive a fastener while maintaining the trigger lever 177 depressed and relying upon the trip member 168 to accomplish actuation may be performed similarly as described in connection with the form of the invention disclosed in FIGS. 6–8.

It will thus be apparent that in all forms of the invention, substantial operational versatility is provided for, and positive safety against actuating the motor mechanism of the machine is afforded unless the driving nose of the machine is properly oriented with respect to a surface into which a fastener is to be driven.

It will be understood that modifications and variations may be effected without departing from the scope of the novel concepts of the present invention.

I claim as my invention:

1. In a fastener driving machine including a supporting structure and pneumatically operated fastener driving motor mechanism having a control valve operative to effect actuation of the motor mechanism, a trigger member mounted on said supporting structure, means connecting the trigger member and said control valve for actuation of the control valve upon actuation of the trigger member, and safety mechanism mounted on said supporting structure and normally disabling said trigger member from operating said connecting means to actuate said control valve, said safety mechanism including a trip member engageable with a surface into which a fastener is to be driven and a member movably connected to the trip member and to the trigger member and movable relative to both the trip member and the trigger member upon tripping of the trip member by engagement thereof with a surface to receive a fastener whereby to condition the trigger member for operation to operate said connecting means to actuate said control valve for actuation of the motor mechanism.

2. In a fastener driving machine including a supporting structure and pneumatically operated fastener driving motor mechanism having a control valve operative to effect actuation of the motor mechanism, a trigger member mounted on said supporting structure, means connecting the trigger member and said control valve for actuation of the control valve upon actuation of the trigger member, and safety mechanism mounted on said supporting structure and normally disabling said trigger member from operating said connecting means to actuate said control valve, said safety mechanism including a trip member engageable with a surface into which a fastener is to be driven and a member movably connected to the trip member and to the trigger member and movable relative to both the trip member and the trigger member upon tripping of the trip member by engagement thereof with a surface to receive a fastener whereby to condition the trigger member for operation to operate said connecting means to actuate said control valve for actuation of the motor mechanism, said trip member being of generally U-shape and provided with a surface engaging foot bar portion and a pair of arms extending into supported relation to said supporting structure.

3. In a fastener driving machine including a supporting structure and pneumatically operated fastener driving motor mechanism having a control valve operative to effect actuation of the motor mechanism, a trigger member mounted on said supporting structure, means connecting the trigger member and said control valve for actuation of the control valve upon actuation of the trigger member, and safety mechanism mounted on said supporting structure and normally disabling said trigger member from operating said connecting means to actuate said control valve, said safety mechanism including a trip member engageable with a surface into which a fastener is to be driven and a member movably connected to the trip member and to the trigger member and movable relative to both the trip member and the trigger member upon tripping of the trip member by engagement thereof with a surface to receive a fastener whereby to condition the trigger member for operation to operate said connecting means to actuate said control valve for actuation of the motor mechanism, said trip member being of generally U-shape and provided with a surface engaging foot bar portion and a pair of arms extending into supported relation to said supporting structure, said foot bar having a central downwardly opening notch therein receptive of a member to be oriented for receiving a securing fastener to secure it to a surface against which the trip member is movably engaged.

4. In a fastener driving machine including a supporting structure and pneumatically operated fastener driving motor mechanism having a control valve operative to effect actuation of the motor mechanism, a trigger member mounted on said supporting structure, means connecting the trigger member and said control valve for actuation of the control valve upon actuation of the trigger member, and safety mechanism mounted on said supporting structure and normally disabling said trigger member from operating said connecting means to actuate said control valve, said safety mechanism including a trip member engageable with a surface into which a fastener is to be driven and a member movably connected to the trip member and to the trigger member and movable relative to both the trip member and the trigger member upon tripping of the trip member by engagement thereof with a surface to receive a fastener whereby to condition the trigger member for operation to operate said connecting means to actuate said control valve for actuation of the motor mechanism, said trip member being of generally U-shape and provided with a surface engaging foot bar portion and a pair of arms extending into supported relation to said supporting structure, said foot bar having a central downwardly opening notch therein receptive of a member to be oriented for receiving a securing fastener to secure it to a surface against which the trip member is movably engaged, said machine including a driving nose portion located adjacent to said trip member and having a downwardly facing tip with a downwardly opening notch therein complementary to said foot bar notch and relative to which the foot bar notch centers the member engaged within the foot bar notch in advance of engagement of the member within the nose tip notch.

5. In a fastener driving machine including a supporting structure having a pneumatically operated fastener driver provided with pneumatic control means comprising a valve, a trigger having means connecting the same with said valve, and means normally disabling said trigger from operating said valve including a pivotally mounted member connected to said trigger and a trip device engageable with a surface into which a fastener is to be driven and thereby actuated to swing said pivotally mounted member to condition the trigger for actuation to operate said valve.

6. In a fastener driving machine including supporting structure having a fastener driver and a pneumatic motor therefor with a pneumatic control system for the motor provided with a control valve, a trigger carried by the supporting structure and having an actuating connection with the control valve, the trigger having an interlock lug, a pawl mounted pivotally on the supporting structure and having a holding detent engageable with the lug to hold the trigger against actuation, and a trip device carried by the supporting structure and engageable with a surface into which a fastener is to be driven whereby to actuate the trip device to move the pawl and release the detent from said lug whereby to condition the trigger for actuation and thus operation of said valve.

7. In a safety mechanism for a pneumatic fastener driving machine having a control valve and a trigger for operating the valve, supporting means, a pawl pivotally mounted on the supporting means and having a detent structure engageable in disabling relation with the trigger, and a reciprocable trip member engaging the pawl and having a portion to be thrust against a surface into which a fastener is to be driven for moving the trip member to actuate the pawl to release the pawl from the trigger.

8. In a pneumatic fastener driving machine including a magazine section having a fastener driving nose on the forward end thereof and a driver including a pneumatic motor in a head section above said nose, a handle projecting rearwardly from said head section above said magazine section, a control valve carried by the handle adjacent to said head section, a trigger lever pivotally mounted under said handle adjacent to said nose section and having an operating connection with said valve for actuating the valve, said trigger lever having a depending interlock lug, means on the magazine section including a rockable pawl member pivotally supported thereby under the trigger lever and having a detent dog engageable with said lug to restrain the trigger lever against actuation, means biasing the pawl member to effect interengagement of said dog with said lug, and a vertically reciprocable trip member carried by said means on the magazine section and having a foot structure on its lower end and engaging said pawl member movably at its upper end, said trip member being thrustable against a surface to receive a fastener and thereby rocking said pawl member in opposition to said biasing means to release said dog from said lug.

9. In a pneumatic fastener driving machine including a magazine section having a fastener driving nose on the forward end thereof and a driver including a pneumatic motor in a head section above said nose, a handle projecting rearwardly from said head section above said magazine section, a valve on the upper side of said handle adjacent to said head, a trigger lever pivotally mounted on the underside of said handle adjacent to said head, means externally of said handle for actuating said valve, a link connected to said trigger lever and to said external actuating means and operable by actuation of said trigger lever to operate said valve, and safety mechanism carried by said magazine section adjacent to said nose and including a trip device normally projecting below said nose for engagement with a surface into which a fastener is to be driven in advance of engagement of the surface by the nose for thereby actuating said trip device as the nose is moved into engagement with the surface, said mechanism including a disabling connection with said trigger lever arranged to be conditoned for valve actuating operation of the trigger lever when said trip device is actuated by engagement with said surface.

10. In a pneumatic fastener driving machine including a magazine section having a fastener driving nose on the forward end thereof and a driver including a pneumatic motor in a head section above said nose, a handle projecting rearwardly from said head section above said magazine section, a valve on the upper side of said handle adjacent to said head, a trigger lever pivotally mounted on the underside of said handle adjacent to said head, means externally of said handle for actuating said valve, a link connected to said trigger lever and to said external actuating means and operable by actuation of said trigger lever to operate said valve, and safety mechanism including a trip member movably carried by said magazine section adjacent to said nose and normally projecting below said nose for engagement with a surface to receive a fastener from said nose and a lever connected to said link and to said trigger lever and to said trip member and operable when said trip is in engagement with a surface to receive a fastener and pivoted thereby to condition the trigger lever for operation to actuate said valve.

11. In a safety mechanism for pneumatic fastener driving machines, a trigger lever, said trigger lever having an intermediately pivoted rock lever thereon, a valve actuating link attached to one end portion of said rock lever, and a trip device attached to the opposite end portion of the rock lever and operable to condition the trigger lever for actuation of the rock lever to operate said link to actuate a control valve upon thrust of said trip device against a work surface to rock said rock lever on said trigger lever.

12. In a fastener driving machine including a head section with a downwardly projecting driving nose and a magazine section projecting rearwardly from the driving nose and a handle projecting rearwardly from the head section in spaced relation above the magazine section, a pneumatic driving motor carried within the head section, a pneumatic control system for the motor including a valve disposed adjacent juncture of the handle with the head section, a trigger lever pivotally mounted under the handle and projecting rearwardly from a pivot connection to the handle and adapted to be manipulated about said pivot upwardly toward the handle, means normally biasing the trigger lever downwardly away from the handle, said trigger lever having a forwardly projecting portion beyond the pivot, a rock lever pivotally mounted on said forwardly projecting portion and having forwardly and rearwardly extending portions from pivotal connection with said forwardly projecting portion, an actuating link member pivotally connected to the forwardly projecting portion of the rock lever and connected to said valve, a trip link pivotally connected to the rearwardly extending portion of said rock lever and projecting downwardly alongside the forward portion of the magazine section, and a trip member pivotally connected to the magazine section and projecting forwardly and downwardly from the pivotal connection and having the trip link pivotally connected to the forward end portion thereof, said forward portion of the trip member normally projecting downwardly beyond the lower end of the nose and being engageable with a surface into which a fastener is to be driven and pivoted upwardly when the nose is brought into engagement with the surface whereby said trip link rocks said rock lever and partially shifts said connecting link toward valve actuation which actuation is then completed by rocking of said trigger lever about its pivot to depress the rock lever relative to said trip link.

13. In a fastener driving machine including a head portion with a downwardly projecting driving nose and a magazine section projecting rearwardly from the driving nose and a handle projecting rearwardly from the head section in spaced relation above the magazine section, a pneumatic driving motor carried within the head section, a pneumatic control system for the motor including a valve disposed adjacent juncture of the handle with the head section, a trigger lever pivotally mounted under the handle and projecting rearwardly from a pivot connection to the handle and adapted to be manipulated about said pivot upwardly toward the handle, means normally biasing the trigger lever downwardly away from the handle, said trigger lever having a forwardly projecting portion beyond the pivot, a rock lever pivotally mounted on said forwardly projecting portion and having forwardly and rearwardly extending portions from pivotal connection with said forwardly projecting portion, an actuating link member pivotally connected to the forwardly projecting portion of the rock lever and connected to said valve, a trip link pivotally connected to the rearwardly extending portion of said rock lever and projecting downwardly alongside the forward portion of the magazine section, and a trip member pivotally connected to the magazine section and projecting forwardly and downwardly from the pivotal connection and having the trip link pivotally connected to the forward end portion thereof, said forward portion of the trip member normally projecting downwardly beyond the lower end of the nose and being engageable with a surface into which a fastener is to be driven and pivoted upwardly when the nose is brought into engagement with the surface whereby said trip link rocks said rock lever and partially shifts said connecting link toward valve actuation which actuation is then completed by rocking of said trigger lever about its pivot to depress the rock lever relative to said trip link, the rear end portion of said trip member and the rear end portion of said rock lever having a biasing spring normally drawing said rear end portions toward one another.

14. In a safety mechanism for a pneumatic fastener driving machine including a head section provided with a pneumatic driving motor therein and having a downwardly projecting driving nose through which a driver motivated by the motor is adapted to drive fasteners delivered to the driving nose from a magazine section below and in spaced relation to a handle thereabove projecting rearwardly from the head section and having a pneumatic control valve and a trigger level pivotally mounted on the handle adjacent to the head section, means normally biasing the trigger lever away from the handle, a rock lever, means pivotally connecting the rock lever intermediately to the trigger lever, an actuating link member pivotally connected to one end portion of the rock lever, a trip link member pivotally connected to the opposite end portion of the rock lever, said trip link member having a foot structure normally projecting below the driving nose for engaging a surface into which a fastener is to be driven in advance of the driving nose, and means for guiding movements of the trip link member as it is displaced by engagement with a surface into which a fastener is to be driven and as it returns to its projecting relation to the driving nose.

15. In a safety mechanism for a pneumatic fastener driving machine including a head section provided with a pneumatic driving motor therein and having a downwardly projecting driving nose through which a driver motivated by the motor is adapted to drive fasteners delivered to the driving nose from a magazine section below and in spaced relation to a handle thereabove projecting rearwardly from the head section and having a pneumatic control valve and a trigger lever pivotally mounted on the handle adjacent to the head section, means normally biasing the trigger lever away from the handle, a rock lever, means pivotally connecting the rock lever intermediately to the trigger lever, an actuating link member pivotally connected to one end portion of the rock lever, a trip link member pivotally connected to the opposite end portion of the rock lever, said trip link member having a foot structure normally projecting below the driving nose for engaging a surface into which a fastener is to be driven in advance of the driving nose, and means for guiding movements of the trip link member as it is displaced by engagement with a surface into which a fastener is to be driven and as it returns to its projecting relation to the driving nose, said guiding means including a guiding structure on the foot portion of the trip link member and a guideway afforded on the front end of the magazine section in association with the driving nose.

16. In a safety mechanism for pneumatic fastener driving machines of the type having a pneumatic motor with a driving nose therebelow and a magazine section extending rearwardly from the driving nose for feeding fasteners thereto, a trigger lever, means connecting the trigger level to a control valve mechanism, and a disabling link member connected to the trigger member, said nose comprising a front plate and a back plate, said back plate having side recess means and said front plate coacting with the front end of the magazine section to provide with said recess a guideway, said disabling link member having a guide portion slidably guided in said guideway, said back plate being shorter than the front plate, and the link member having a presser foot coactive with the lower end of the back plate and the adjacent lower end portion of the front plate to provide a fastener driveway when the link member is displaced by engagement with a surface into which a fastener is to be driven.

17. In a fastener driving machine including means providing a pneumatic motor and a driving nose assembly, said driving nose assembly having sides provided with vertical guide recesses, and means for controlling operation of said motor including a safety link device having portions thereof guidedly received in said guide recesses and a portion normally projecting therebelow and providing a presser foot adapted to project beyond said nose assembly in the down position of the link device.

18. In a fastener driving machine including means providing a pneumatic motor and a driving nose assembly, said driving nose assembly having sides provided with vertical guide recesses, and means for controlling operation of said motor including a safety link member having portions thereof guidedly received in said guide recesses and a portion normally projecting therebelow and providing a presser foot adapted to project beyond said nose assembly in the down position of the link member, said presser foot coacting with a portion of said nose assembly to provide a fastener driveway in the upwardly depressed position of the link member.

References Cited in the file of this patent
UNITED STATES PATENTS 2,645,772   Walker _____ July 21, 1953
2,854,953   Osborne _____ Oct. 7, 1958